April 27, 1965
J. MALESKO
3,180,052
SINKER FOR A FISHING LINE AND THE LIKE
Filed Nov. 21, 1963
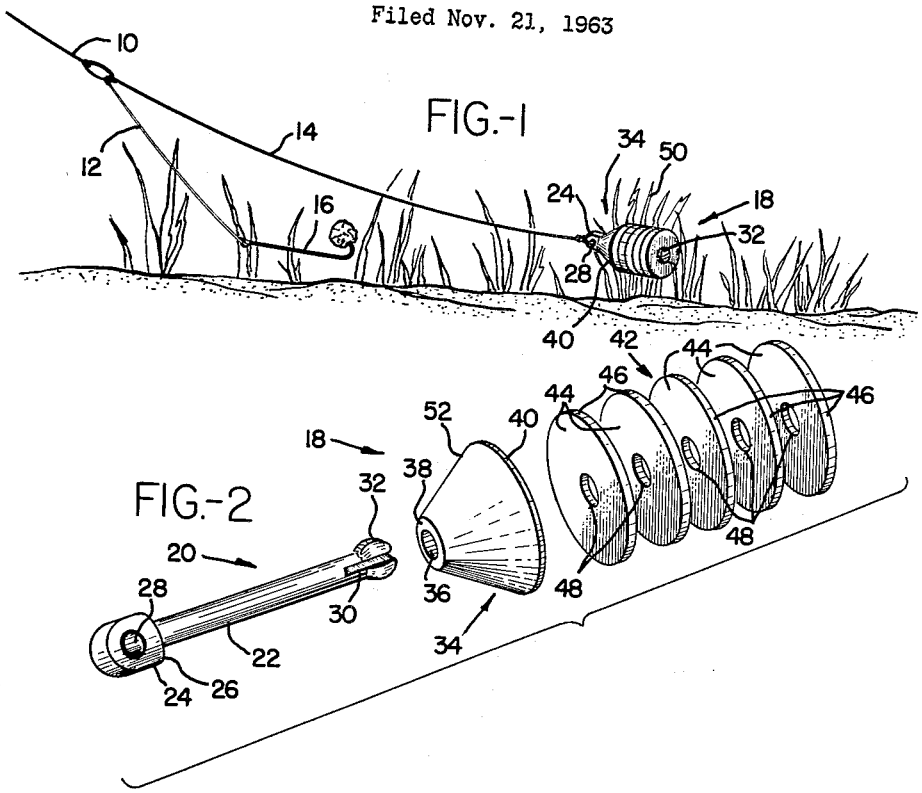
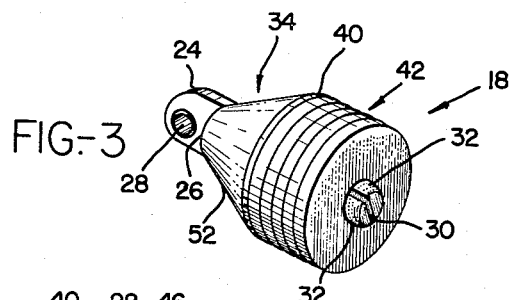
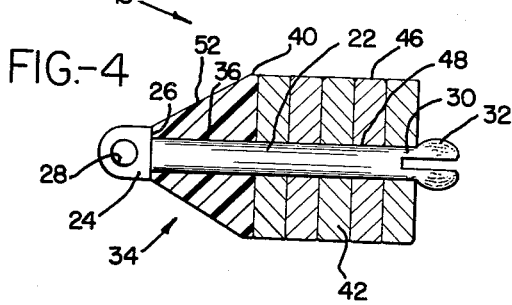
INVENTOR.
JOSEPH MALESKO
BY
*Cauder & Cauder*
HIS ATTORNEYS они
United States Patent Office 3,180,052
Patented Apr. 27, 1965

3,180,052
SINKER FOR A FISHING LINE AND THE LIKE
Joseph Malesko, Dayton, Ohio, assignor of thirty-five percent to Joseph Piekutowski, Jr.
Filed Nov. 21, 1963, Ser. No. 325,348
5 Claims. (Cl. 43—43.12)

This invention relates to a sinker for a fishing line and the like.

An object of this invention is to provide a sinker for a fishing line and the like which can be efficiently manufactured at relatively low cost while at the same time providing an attractive, durable, and effective product.

Another object is to provide a sinker having a central supporting rod with a weed guard adjacent an arresting member at one end of the rod, with a plurality of flat, disc-like weights on the rod adjacent the weed guard, and with a resilient prong construction at the other end of the rod to hold the weed guard and the weights on the rod.

Another object of this invention is to provide a sinker with a plastic central rod and a plastic weed guard, and with a plurality of flat, disc-like weights made of relatively heavy, non corrosive metal, with these parts being susceptible of efficient manufacture of the individual parts, and of effective and easy assemblage of the parts, either by the manufacturer, or by the user, as desired.

Other objects of this invention are apparent from this description, the appended claimed subject matter, and/or the accompanying drawings, in which:

FIGURE 1 is a diagrammatic view of the sinker with one form of attachment to a fishing line.

FIGURE 2 is an exploded perspective view of the sinker.

FIGURE 3 is an assembled perspective view of the sinker.

FIGURE 4 is a diagrammatic cross sectional view of the assembled sinker.

A sinker according to this invention may be attached to a fishing line 10 in any desired manner. For example, the fishing line may have a hook carrying portion 12, and a sinker carrying portion 14. This particular arrangement of fishing line construction or assemblage is intended to be merely typical, however, and it is to be understood that the fishing line may be arranged in any other desired manner, and may support the sinker in various ways. Hence a fishing hook 16, and the sinker 18 of this invention may be attached to the fishing line 10 in any desired manner.

The sinker may include a central, smooth rod 20, which may be cylindrical, having a main body 22 of uniform cross section. The rod 20 may have an enlargement 24 at one end forming a weed guard arresting shoulder 26 and a line attaching orifice 28, for attachment to the fishing line.

The rod 22 may have a pair of outwardly resilient prongs 30 at the other end of the rod. These prongs 30 may have outwardly smoothly rounded weight and guard holding heads 32.

A frusto-conical weed guard 34 may be circularly cross sectioned, and may have a cylindrical central passageway 36 snugly fitting around the main body 22 of the rod 20. To string the weed guard on the rod, the passageway 36 may be moved past the heads 32 while such heads are pressed toward each other. The small end 38 of the guard 34 engages the shoulder 26, and the large end 40 of the guard is directed toward the heads 32.

A plurality of flat weights 42 are placed around or strung over the main body 22 of the rod 20 between the guard 34 and the heads 32. The weights 42 may have substantially parallel sides 44 and circular cylindrical outer walls 46, which may be substantially of the same outer diameter as the large end 40 of the guard 34. The weights 42 may have inner cylindrical openings 48 snugly fitting over the main body 22 of the rod 20. The weights 42 are pushed or moved past the heads 32 while the heads are pressed toward each other. The weights are maintained on the rod and are substantially arrested on such rod by such heads when the heads are not pressed toward each other.

The sinker construction is such that the guard 34, and any desired number of weights 42 may be placed or strung on the rod 20, by forcing the guard and the weights past the smoothly curved heads 32. After these members have been so forced over the heads 32, they are substantially arrested on the rod 20 by the heads, and they are not likely to slip off such rod 20 and past the heads 32, unless such heads are deliberately pressed together, or unless the weights 42 and the guard 34 are strongly forced past such heads 32.

If desired, the large end 40 of the weed guard 34 may be made with a short cylindrical surface, as illustrated, which is substantially identical in diameter with the outer surfaces 46 of the weights 42. The sinker presents an arresting head 26, and the small end 36 of the weed guard 34 may also have substantially smoothly engaging outer surfaces. This guard construction is so arranged, that it can be pulled past weeds 50 and the frusto-conical guard 34 in combination with aligned weights 42 is such that neither the guard 34 nor the weights 42 are likely to tangle with the weeds. In this manner the sinker can be pulled through the weeds without danger of loss.

The guard 34 is also effective to prevent tangling with weeds even when a lesser number of weights 42 is placed on the rod 20. The guard 34 engages the rod body 22 snugly and the leading edge 36 is sufficiently small to wedge past the weeds without tangling with them.

The rod 20, and the weed guard 34 may be made of plastic material, which is relatively light, strong, and non corrosive. For example, the main body 22 of the rod 20 may be 5/32 of an inch in diameter, more or less. The inner diameter of the passageway 36 of the cone 34 may be made about .005 to .007 inch greater than the diameter of the body 22. The angle of the side wall 52 of the cone shaped guard 34 may be 30°, more or less, with respect to the longitudinal axis of the cone. The large end of the cone may be ½ inch, more or less, as desired. The length of the rod 20 may be 1 3/16 inches overall length with the heads 32 having an outer width of .20 inch, more or less, at their widest part. The prongs 30 may be spaced apart sufficiently to allow the heads 32 to pass through the passageway 36 of the weed guard 34 and through the passageways 48 of the weight 42. The prongs may be ¼ inch long, for example, with the curved parts of the heads being 5/32 of an inch along the longitudinal axis of the rod. The openings 48 of the weights 42 may be the same as the opening 36 of the guard 34 and the outer walls 46 of the weights 42 may be substantially the same as the outer wall 40 of the guard 34. These sizes are given by way of example, however, and may be varied as desired. The construction is such that the guard 34 and any desired number of weights 42 may be strung on the rod body 22 over the heads 32. Thereafter the heads 32 produce a sufficient arresting action on the weights 42 and the guard 34 to prevent them from being pulled off the rod body 22 by the weeds 50.

The sinker construction is such that the rod 20 and the weed guard 34 may be molded from plastic material in suitable presses or the like, and the weights 42 may be stamped, pressed, or otherwise formed from any suitable material, which is non corrosive, and yet strong enough to withstand normal impacts, bending actions, and the like. Such material may be any suitable non corrosive lead alloy and the like. The weights 42 may be painted with attractive colors, if desired.

The cone shaped guard 34 acts as a protector. Weights 42 may be added or subtracted as desired, without tying or untying operations. If the sinker should become tangled or snagged in weeds 50 or the like, the weights 42 and guard 34 generally can eventually be pulled off without likelihood of breaking the line 10, 12 and 14, because of the curved shape of the heads 32. This occurs notwithstanding that the heads 32 offer considerable resistance to such pulling off action. This will save the bait and hook 16 and any fish that may have been hooked.

The sinker may be adjusted to many different sizes or weights by adding or subtracting weights. Also, many different sizes of weights 42 and guards 34 may be substituted on the rod 22 to provide different sized sinkers.

It is thus to be seen that a new, useful and unobvious sinker construction has been provided by this invention, having components which may be readily manufactured by press forming operations, and may be readily assembled either by the manufacturer or the user, as desired.

While the form of the invention now preferred has been disclosed as required by statute, other forms may be used, all coming within the scope of the claimed subject matter which follows.

What is claimed is:

1. A sinker for a fishing line comprising: a central smooth cylindrical rod having an enlargement at one end forming a weed guard arresting shoulder and attaching orifice, said rod having outwardly resilient prongs at the other end with outwardly smoothly rounded weight and guard holding heads; a frusto-conical weed guard having a cylindrical central passageway snugly and slidingly fitting around said cylindrical rod and movable past said weight and guard holding heads when said heads are pressed toward each other with the small end of said guard engaging said shoulder and with its large end directed toward said heads; and a plurality of flat weights on said rod between said guard and said heads, said weights having circular cylindrical outer walls substantially of the same diameter as the large end of said guard and having inner cylindrical openings snugly and slidingly fitting over said rod and movable past said heads when said heads are pressed toward each other but substantially arrested by said heads when said heads are not pressed toward each other, said cylindrical central passageway of said guard and said cylindrical openings of said weights having inner diameters slightly and sufficiently greater than the diameter of said cylindrical rod to permit said guard to act as a protector for said weights when a lesser number of said weights are placed on said rod, said inner diameters of said guard and said weights being sufficiently larger than the diameter of said rod to permit said guard and weights to be pulled off said rod past said outwardly smoothly rounded weight and guard holding heads without likelihood of breaking said fishing line if said sinker would become snagged in weeds and the like.

2. A sinker according to claim 1 with said rod made of plastic material.

3. A sinker according to claim 1 with said guard made of plastic material.

4. A sinker according to claim 1 with said weights made of relatively heavy non corrosive metal.

5. A sinker according to claim 1 with said rod and guard made of plastic material and said weights made of relatively heavy metal.

References Cited by the Examiner
UNITED STATES PATENTS

| 1,900,574 | 3/33 | Meader | 24—214 |
| 2,379,676 | 7/45 | Blackstone | 43—44.93 X |
| 2,557,776 | 6/51 | Anderson | 43—43.14 |
| 2,594,620 | 4/52 | Braithwaite. | |
| 2,651,135 | 9/53 | Greenleaf | 43—43.14 |
| 3,106,759 | 10/63 | Kytta | 24—213 X |

ABRAHAM G. STONE, *Primary Examiner.*